(12) United States Patent
Claussen-Markefka

(10) Patent No.: US 7,172,494 B2
(45) Date of Patent: Feb. 6, 2007

(54) CRANKSHAFT AND CAMSHAFT GRINDER

(75) Inventor: Heino Claussen-Markefka, Rödermark (DE)

(73) Assignee: EMAG Maschinenfabrik GmbH, Salach (DE)

( * ) Notice: Subject to any disclaimer, the term of this patent is extended or adjusted under 35 U.S.C. 154(b) by 0 days.

(21) Appl. No.: 11/285,498

(22) Filed: Nov. 22, 2005

(65) Prior Publication Data

US 2006/0111020 A1  May 25, 2006

(30) Foreign Application Priority Data

Nov. 24, 2004  (DE) ...................... 10 2004 056 802

(51) Int. Cl.
*B24B 19/12* (2006.01)
(52) U.S. Cl. ............................ 451/11; 451/62; 451/251
(58) Field of Classification Search .................... 451/5, 451/11, 62, 123, 179, 249, 251
See application file for complete search history.

(56) References Cited

U.S. PATENT DOCUMENTS 1,843,301 A  *  2/1932  Player et al. .................. 451/62
5,697,831 A  *  12/1997  Reichel ....................... 451/246

FOREIGN PATENT DOCUMENTS

| AT | 169 839 | 12/1951 | |
|----|---------|---------|---|
| DE | 28 00 565 | 7/1978 | |
| DE | 92 187 553 | 11/1994 | |
| DE | 100 30 087 | 1/2002 | |
| EP | 0 990 483 | 4/2000 | |
| GB | 595115 | * 11/1947 | ................. 451/249 |
| WO | WO 84/04480 | 11/1984 | |
| WO | WO 01/10597 | 2/2001 | |

* cited by examiner

*Primary Examiner*—Robert A. Rose
(74) *Attorney, Agent, or Firm*—Andrew Wolford

(57) ABSTRACT

An apparatus for grinding a surface of a nonstraight elongated workpiece has a frame, drives on the frame for rotating the workpiece about a longitudinal workpiece axis, and a guide defining a pivot axis offset from the workpiece axis on the frame. A hanging arm has an inner end juxtaposable with the workpiece and an outer end pivoted at the pivot axis on the guide. A rotary grinding tool is provided on the arm inner end.

6 Claims, 2 Drawing Sheets

CRANKSHAFT AND CAMSHAFT GRINDER

FIELD OF THE INVENTION

The present invention relates to a grinder for a nonstraight workpiece. More particularly this invention concerns grinding the journals and cams of a crankshaft or camshaft.

BACKGROUND OF THE INVENTION

In many machining applications, most typically grinding the surfaces of the cams and journals of camshafts and crankshafts, the nonstraight workpiece is rotated about a normally horizontal axis while a grinding tool is urged against the surface to be ground. Since the cams and journals are offset from the axis about which the nonstraight workpiece is rotated, it is necessary for the grinding tool to reciprocate radially synchronously as the workpiece rotates so as to stay in contact with the surface being machined. The workpiece is chucked between a headstock and tailstock mounted on a bed that is typically stepped parallel to the axis to bring the surfaces to be ground one after another into alignment with the grinder.

In German utility model 92 18 553 this is accomplished by mounting the grinding tool on a slide that shifts on horizontal rails underneath and slightly to the side of the workpiece in a direction perpendicular to a vertical plane including the workpiece rotation axis. An appropriate actuator slides the grinding tool back and forth as the workpiece rotates. The workpiece and/or the tool slide can be shifted parallel to the axis so that the tool can be brought into engagement with the axially spaced surfaces of the workpiece.

The grinding tool is thus subjected to fouling from the cutting oil and coolant that is applied to the workpiece, and that flies off radially during the machining operation. In addition particles from the machining operation can get into the slide rails, leading to premature wear. Furthermore the relatively massive slide arrangement necessitates a fairly powerful actuator to move the grinding tool synchronously with the rotating workpiece.

OBJECTS OF THE INVENTION

It is therefore an object of the present invention to provide an improved grinding system.

Another object is the provision of such an improved grinding system that overcomes the above-given disadvantages, in particular that is set up such that the grinding tool and its mount are largely protected from the mess generated while grinding, and where the mass of the grinding tool can be reduced without impairing its function.

SUMMARY OF THE INVENTION

An apparatus for grinding a surface of a nonstraight elongated workpiece has according to the invention a frame, drives on the frame for rotating the workpiece about a longitudinal workpiece axis, and a guide defining a pivot axis offset from the workpiece axis on the frame. A hanging arm has an inner end juxtaposable with the workpiece and an outer end pivoted at the pivot axis on the guide. A rotary grinding tool is provided on the arm inner end.

Thus with this system the grinder is not mounted on a slide, but instead pivots, according to the invention about an axis that is above and horizontally offset from the pivot axis. Thus there is no complex slide structure that can get fouled, and the actuator does not have to displace a massive slide along with the grinding tool, which typically is a wheel carried directly on an motor output shaft.

According to the invention an actuator is connected to the arm for pivoting the tool about the pivot axis and pressing the tool against the workpiece. This actuator is braced between a pivot supporting the actuator for rotation about an actuator axis along the rod parallel to the pivot axis and another pivot connecting the actuator means to the arm and defining a connecting axis parallel to the pivot axis and actuator axis. Thus the actuator expands to move the actuator axis and connector axis apart and thereby press the grinding tool against the workpiece, or retracts to pull it back away from the workpiece axis. The actuator can be set to simply bias the grinding tool with the required force against the workpiece, or can actually operate synchronously with the drive that rotates the workpiece to follow the contour of the part being ground.

In accordance with the invention the guide is a rod fixed in the frame and extending along the pivot axis. The apparatus further has drives for shifting the arm, actuator means, and grinding tool synchronously parallel along the pivot axis. Thus the normally very heavy workpiece can be clamped and rotated, and the much lighter grinder is stepped axially along it to grind the cams or journal surfaces of the workpiece. The drive for rotating the workpiece can thus be fixed axially on the frame.

The arm carrying the grinder is supported according to the invention on the rod by an open bearing and the frame has a pair of axially spaced end flanges in which ends of the rod are fixed.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
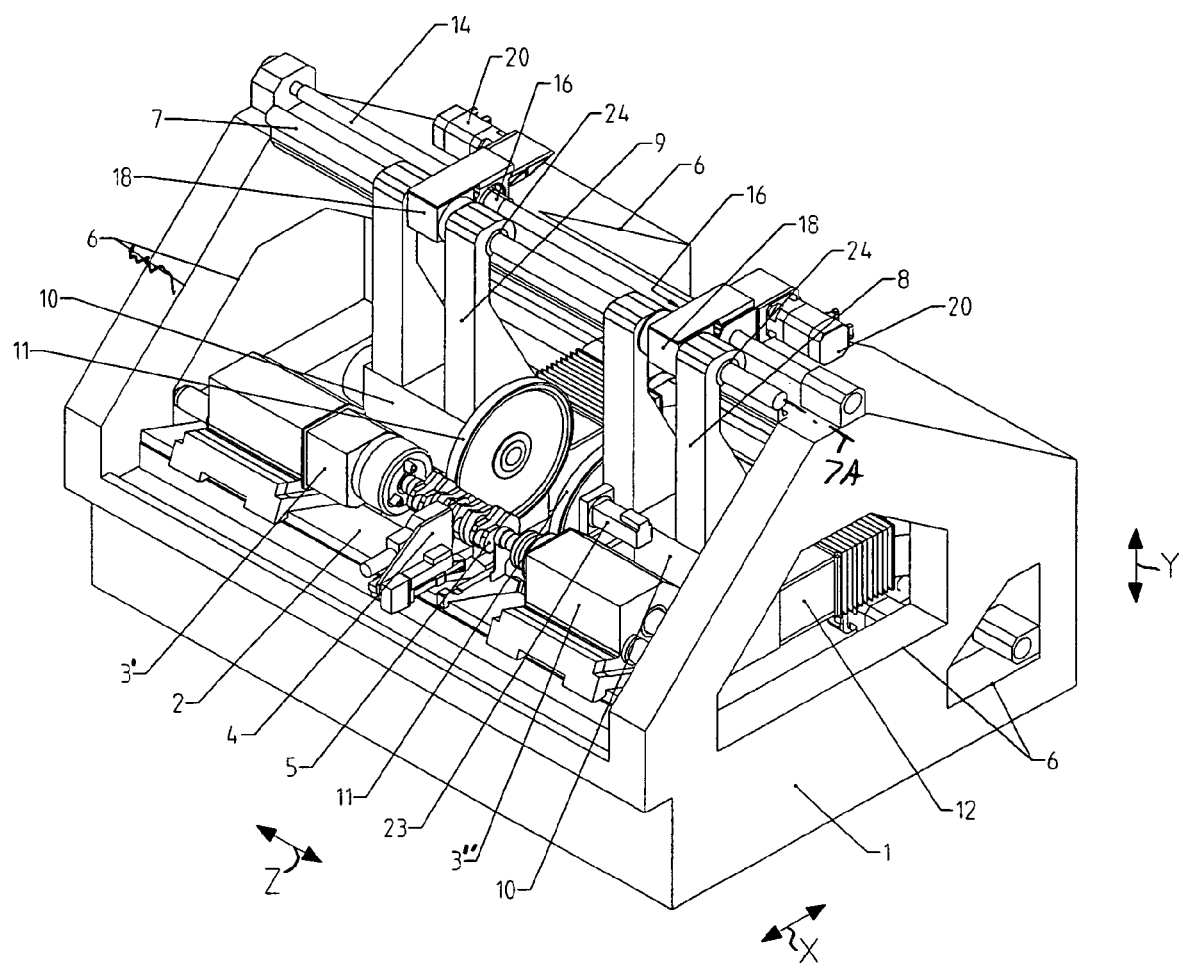
FIG. 1 is a perspective view of a grinding apparatus according to the invention.
Figure 2:
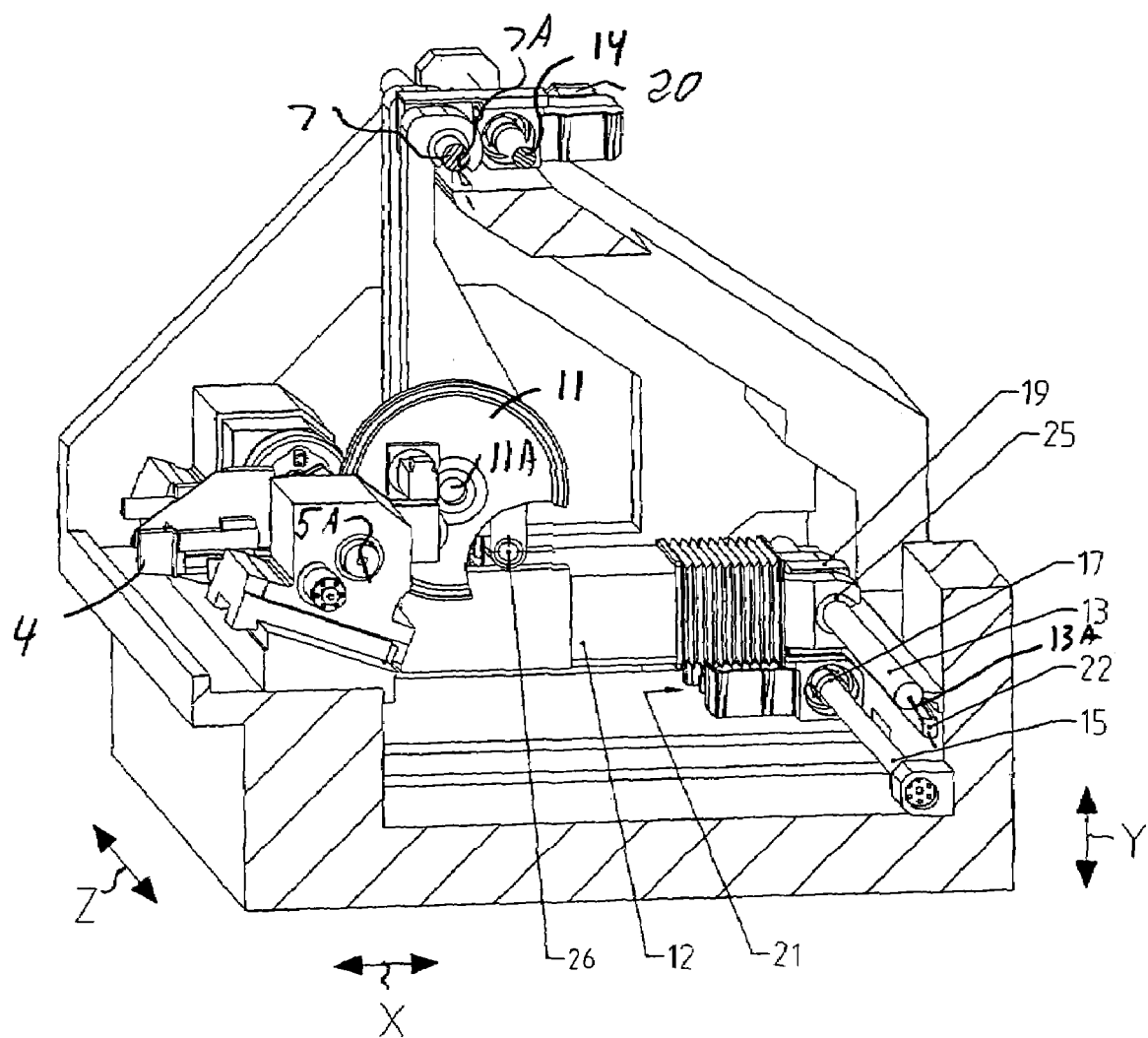
FIG. 2 is a cross-section through the apparatus.

As seen in FIGS. 1 and 2, the grinding system according to the invention has a massive frame 1 on which is provided a machine bed 2 carrying a headstock 3' and tailstock 3" between which is spanned a workpiece 5, here a camshaft, for rotation, about a horizontal axis 5A extending parallel to a coordinate or direction Z. A brace 4 bears radially on the workpiece 5. The frame 1 is formed at its ends with apertures 6 giving access to the elements of the grinding system.

A stationary cylindrical guide rod 7 defining an axis 7A is fixed in the frame 1 to extend parallel to the axis 5A well above this axis 5A and somewhat rearward of it. A pair of axially spaced arms 8 and 9 have upper ends provided with open ball-type slide bearings 24 traversed by and slidable along the rod 7 and lower ends attached to a grinder body 10 having a wheel 11 rotatable about an axis 11A parallel to the axes 5A and 7A. The body 10 contains a motor for rotating the wheel 11. Thus the wheel 11 can move axially parallel to the guide rod in the direction Z and, by swinging about the axis 7A, in a horizontal direction x perpendicular to the direction Z. A dresser 23 for the wheel 11 is carried on the tailstock 3".

Another cylindrical guide rod 13 is fixed in the frame 1 and extends on an axis 13A parallel to the axes 5A and 7A rearward of the axis 5A. An actuator 12, e.g. a linear motor, a roller-ball spindle, or a hydrodynamic threaded spindle, has a rear end provided with a slide bearing 25 traversed by and slidable along the rod 14 and a front end fixed at a pivot 26 to the grinder 10. This actuator 12 can be expanded and contracted horizontally to shift the axis 11A about the axis 7A, moving the wheel 11 mainly horizontally in the direction X.

Roller-ball spindles 14 and 15 are axially fixed in the frame 1 next to the guide rods 7 and 12. A control system including synchronously operating servomotors 20 carried on the arms 8 and 9 and a servomotor 21 on the actuator 12 and nuts 16 and 17 on the rods 13 and 14 displace the entire grinder unit formed by the two arms 8 and 9, the grinder 10, and the actuator 12 axially on the frame 1 in the direction Z. A gauge bar 22 forms part of a system for detecting the position in the direction Z of the wheel 11.

I claim:

1. An apparatus for grinding a surface of a nonstraight elongated workpiece, the apparatus comprising:
    a frame;
    means on the frame for rotating the workpiece about a longitudinal workpiece axis;
    a guide defining a pivot axis offset from the workpiece axis on the frame;
    an arm having an inner end juxtaposable with the workpiece and an outer end pivoted at the pivot axis on the guide; and
    a rotary grinding tool on the arm inner end; and
    actuator means connected to the arm controlledly expansible and contractible for pivoting the tool about the pivot axis and pressing the tool against the workpiece.

2. The grinding apparatus defined in claim 1, further comprising
    a pivot supporting the actuator means for rotation about an actuator axis along the guide parallel to the pivot axis and
    another pivot connecting the actuator means to the arm and defining a connecting axis parallel to the pivot axis and actuator axis.

3. The grinding apparatus defined in claim 2 wherein the guide is a rod fixed in the frame and extending along the pivot axis, the apparatus further comprising
    means for shifting the arm, actuator means, and grinding tool synchronously parallel along the pivot axis.

4. The grinding apparatus defined in claim 3 wherein the means on the frame for rotating the workpiece are fixed axially on the frame.

5. The grinding apparatus defined in claim 4 wherein the arm is supported on the rod by an open bearing and the frame has a pair of axially spaced end flanges in which ends of the rod are fixed.

6. An apparatus for grinding a surface of a nonstraight elongated workpiece, the apparatus comprising:
    a frame;
    means on the frame for rotating the workpiece about a longitudinal workpiece axis;
    a guide rod fixed in the frame and defining a pivot axis above the workpiece axis;
    an arm having a lower end juxtaposable with the workpiece and an upper end pivoted at the pivot axis on the guide rod;
    a rotary grinding tool on the arm lower end;
    means for shifting the arm, actuator means, and grinding tool synchronously parallel along the pivot axis;
    actuator means pivotal on the frame about an actuator axis generally parallel to and horizontally offset from the workpiece axis and below the pivot axis controlledly expansible and contractible for shifting the tool toward and away from the workpiece axis synchronously with rotation of the workpiece about the workpiece axis; and
    a pivot connecting the actuator means with the grinding tool at a connecting axis generally parallel to the pivot axis and actuator axis.

* * * * *